United States Patent
Halada et al.

(10) Patent No.: US 10,165,628 B2
(45) Date of Patent: Dec. 25, 2018

(54) CIRCUIT FOR THE INDUCTIVE HEATING OF A METAL

(71) Applicant: KE KELIT Kunststoffwerk Gesellschaft m.b.H., Linz (AT)

(72) Inventors: Lucian Halada, Linz (AT); Maximilian Wurmitzer, Krakaudorf (AT)

(73) Assignee: KE KELIT Kunststoffwerk Gesellschaft m.b.H., Linz (AT)

( * ) Notice: Subject to any disclaimer, the term of this patent is extended or adjusted under 35 U.S.C. 154(b) by 949 days.

(21) Appl. No.: 14/372,557

(22) PCT Filed: Jan. 15, 2013

(86) PCT No.: PCT/AT2013/050010
§ 371 (c)(1),
(2) Date: Jul. 16, 2014

(87) PCT Pub. No.: WO2013/106877
PCT Pub. Date: Jul. 25, 2013

(65) Prior Publication Data
US 2014/0361007 A1 Dec. 11, 2014

(30) Foreign Application Priority Data
Jan. 17, 2012 (AT) .............. A 50006/2012

(51) Int. Cl.
*H05B 6/10* (2006.01)
*H05B 6/06* (2006.01)
(Continued)

(52) U.S. Cl.
CPC .............. *H05B 6/06* (2013.01); *B29C 65/36* (2013.01); *B29C 65/3644* (2013.01);
(Continued)

(58) Field of Classification Search
CPC ..... B29C 66/71; B29C 65/36; B29C 65/3644; B29C 65/3648; B29C 66/5221;
(Continued)

(56) References Cited

U.S. PATENT DOCUMENTS 5,125,690 A 6/1992 Taylor et al.
5,373,143 A 12/1994 Pfaffmann
(Continued)

FOREIGN PATENT DOCUMENTS

AT 510 265 A4 3/2012
EP 0 014 729 A1 9/1980
(Continued)

OTHER PUBLICATIONS

International Search Report of PCT/AT2013/050010, dated Mar. 27, 2013.

*Primary Examiner* — Michael G Hoang
(74) *Attorney, Agent, or Firm* — Collard & Roe, P.C.

(57) ABSTRACT

An inductive welding device includes a circuit for the inductive heating of a metal that is embedded in a non-magnetic bed. A transformer induces eddy currents in the metal as a function of an exciter current and an exciter voltage and forms a load impedance together with the metal to be heated. Temperature monitoring is provided for the metal to be heated. The load impedance is operated in the region of the resonant frequency of the load impedance. The exciter current and exciter voltage and their phase shift relative to each other are measured and logged when the metal is heated. A temperature progression which is proportional to the phase shift is calculated from the exciter current, exciter voltage, and phase shift.

5 Claims, 3 Drawing Sheets

(51) Int. Cl.
*G01K 7/32* (2006.01)
*B29C 65/00* (2006.01)
*B29C 65/36* (2006.01)

(52) U.S. Cl.
CPC ...... *B29C 66/522* (2013.01); *B29C 66/73921* (2013.01); *B29C 66/9192* (2013.01); *B29C 66/91214* (2013.01); *B29C 66/91216* (2013.01); *B29C 66/91221* (2013.01); *B29C 66/91443* (2013.01); *B29C 66/91651* (2013.01); *B29C 66/91951* (2013.01); *B29C 66/963* (2013.01); *G01K 7/32* (2013.01); *H05B 6/105* (2013.01); *B29C 65/3648* (2013.01); *B29C 66/5221* (2013.01); *B29C 66/5229* (2013.01); *B29C 66/71* (2013.01); *B29C 66/73773* (2013.01); *B29C 66/73774* (2013.01); *B29C 66/919* (2013.01); *G01K 2217/00* (2013.01)

(58) Field of Classification Search
CPC .............. B29C 66/522; B29C 66/5229; B29C 66/73921; B29C 66/91216; B29C 66/91443; B29C 66/91214; B29C 66/963; B29C 66/73773; B29C 66/91221; B29C 66/919; B29C 66/91951; B29C 66/73774; B29C 66/91651; B29C 66/9192; B29K 2023/06; H05B 6/06; H05B 6/105; H05B 66/5221; H05B 66/522; H05B 66/5229; H05B 66/73921; H05B 66/91216; H05B 66/91443; H05B 66/91214; H05B 66/963; H05B 66/73773; H05B 66/91221; H05B 66/919; H05B 66/91951; H05B 66/73774; H05B 66/91651; H05B 66/9192; H05B 66/71; H05B 6/10

USPC ....... 219/633, 660, 635, 643, 644, 607, 667, 219/670, 672

See application file for complete search history.

(56) References Cited

U.S. PATENT DOCUMENTS

| | | |
|---|---|---|
| 5,573,613 A | 11/1996 | Lunden |
| 5,760,379 A | 6/1998 | Matsen et al. |
| 6,455,825 B1 | 9/2002 | Bentley et al. |
| 2008/0121633 A1 | 5/2008 | Pinilla et al. |
| 2011/0120989 A1 | 5/2011 | Schilling et al. |

FOREIGN PATENT DOCUMENTS

| | | |
|---|---|---|
| GB | 2 091 428 A | 7/1982 |
| WO | 2007/128384 A2 | 11/2007 |

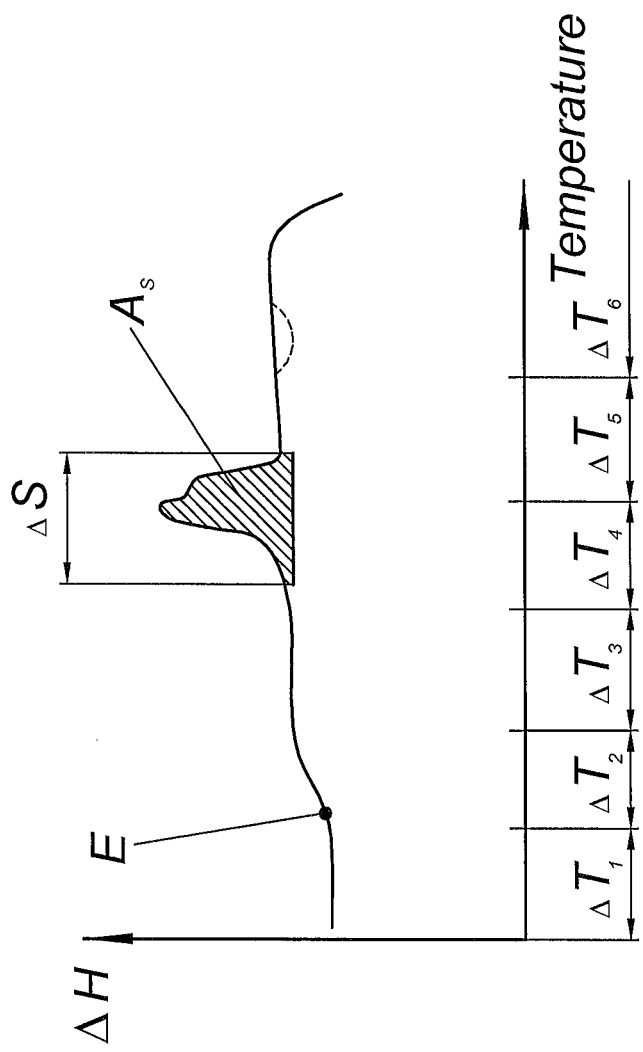

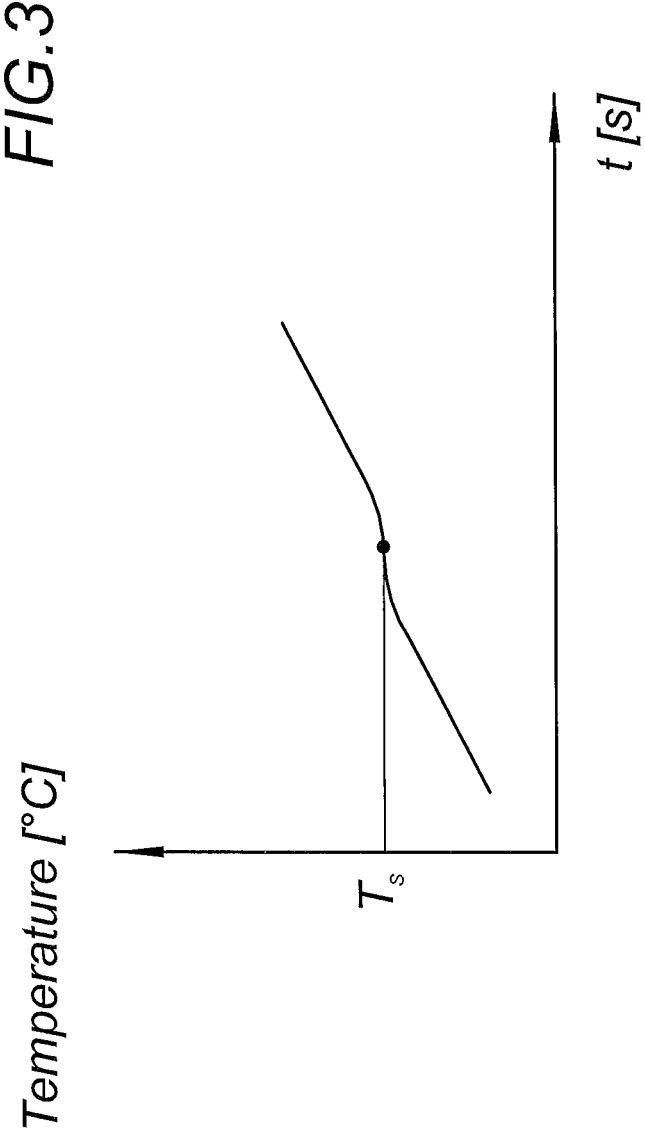

US 10,165,628 B2

CIRCUIT FOR THE INDUCTIVE HEATING OF A METAL

CROSS REFERENCE TO RELATED APPLICATIONS

This application is the National Stage of PCT/AT2013/050010 filed on Jan. 15, 2013, which claims priority under 35 U.S.C. § 119 of Austrian Application No. A 50006/2012 filed on Jan. 17, 2012, the disclosure of which is incorporated by reference. The international application under PCT article 21(2) was not published in English.

FIELD OF THE INVENTION

The invention relates to a circuit for the inductive heating of a metal that is optionally embedded in a non-magnetic bed by means of a transformer, which induces eddy currents in the metal as a function of an exciter current and an exciter voltage, and which forms a load impedance together with the metal to be heated, wherein temperature monitoring is provided for the metal to be heated.

DESCRIPTION OF THE PRIOR ART

Such circuits which are integrated in welding apparatuses are used for connecting individual shots of a plastic line. For this purpose, pipes or jacket pipes made of a thermoplastic synthetic material are connected to each other via a thermoplastic connecting sleeve. It is known for this purpose (WO 2007/128384 A2) to insert one respective self-contained ring made of a perforated plate between the sleeve and the pipes made of thermoplastic synthetic material in order to induce eddy currents in the perforated plate ring by means of an induction coil surrounding the sleeve in the region of the perforated plate ring, via which the plate ring is heated with the effect that the thermoplastic material of the sleeve and the jacket pipes to be connected are molten down in the connecting region, so that an intimate welded connection is obtained between the sleeve and the jacket pipes through the perforated plate.

Such an apparatus is further described in A 2058/2010. One of the most important advantages of a welding method that is provided thereby is that no connecting wires are required for supplying the necessary welding energy to the connecting sleeve. This avoids disturbance zones at the transition point between welded and non-welded material, as occurs otherwise in heater-spiral resistance welding methods in the passage region of the connecting wires. As in all methods it is desirable to monitor the welding process with respect to its temperature, and to optionally control it too. Up until now, this could only be achieved with a temperature sensor provided in the welding region, which is impractical for mounting reasons however.

SUMMARY OF THE INVENTION

The invention is thus based on the object of providing a circuit for the inductive heating of a metal optionally embedded in a non-magnetic bed, especially for the inductive welding of a sleeve to the jacket pipe of a long-distance heating line, in such a way that a determination of the temperature progression in the welding region is enabled without endangering secure welding. In particular, the monitoring of complete melt-down of the welding region and logging of the welding seam shall be possible according to a further development of the invention.

This object is achieved by the invention in such a way that the load impedance is preferably operated in the region of the resonant frequency thereof, the exciter current and the exciter voltage and their phase shift relative to one another are measured during the heating of the metal and logged, and a temperature progression, which is proportional to the phase shift, is calculated from the exciter current, the exciter voltage and the phase shift. Advantageous further developments of the invention are shown in the sub-claims.

BRIEF DESCRIPTION OF THE DRAWINGS

The invention is schematically shown in the drawings by reference to an embodiment, wherein:

FIG. 2 shows a diagram representing the enthalpy over time during the welding process of a plastic sleeve, and FIG. 3 shows a diagram representing the temperature progression over time in the welding region of a plastic sleeve.

DESCRIPTION OF THE PREFERRED EMBODIMENT

Figure 1:
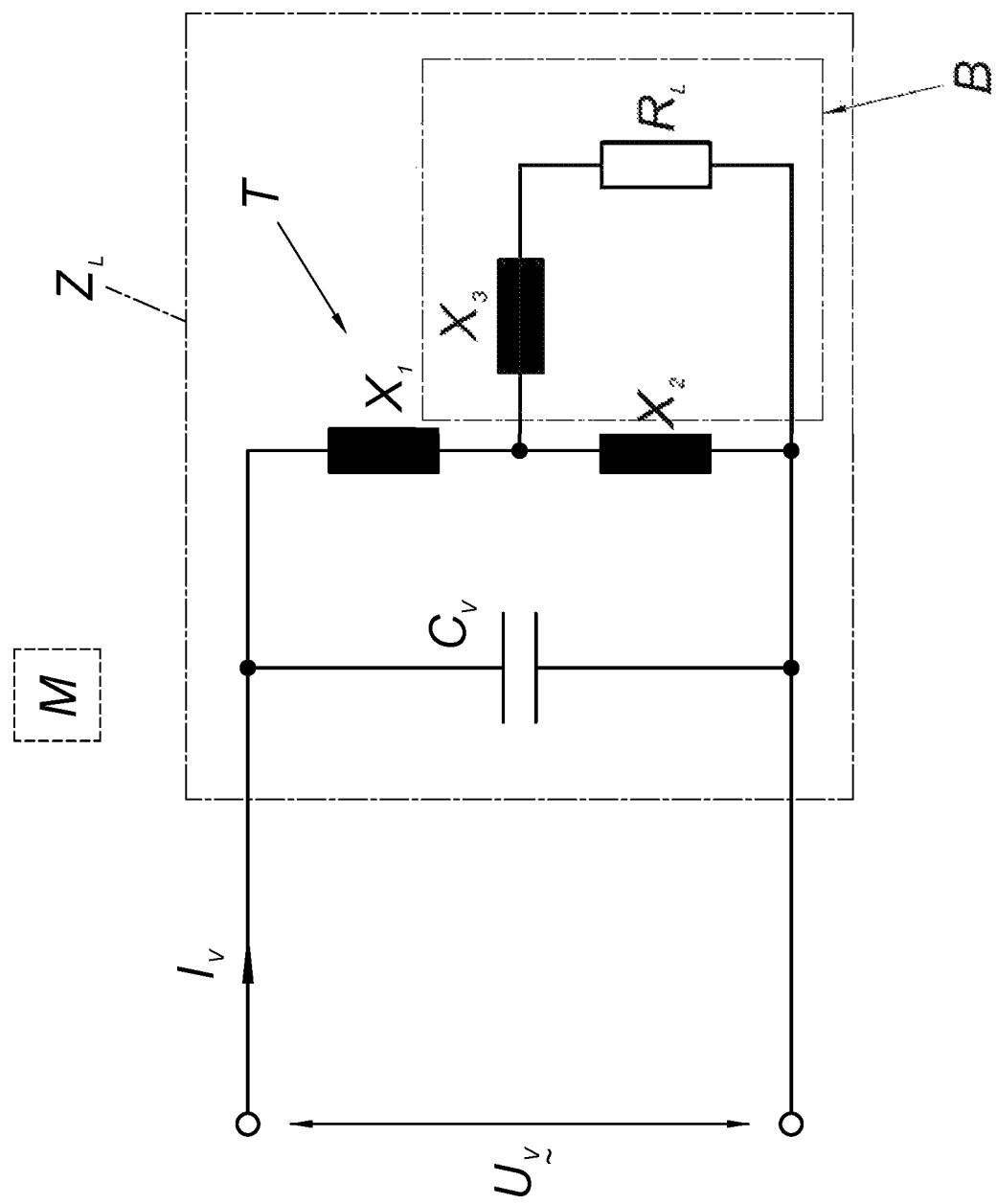
FIG. 1 shows a simplified diagram of the circuit in accordance with the invention.

In order to entirely avoid the systemic weaknesses which are linked to the supply or introduction of electrically conductive cables or wires both for welding and also for temperature monitoring in the welding zone, a contactless indirect temperature measurement is provided in accordance with the invention.

For this purpose it is necessary to enable the determination of the temperature in the secondary coil, i.e. the closed heating metal, e.g. a heating metal strip, from the parameters which are transmitted via a primary coil during induction welding to the welding generator and are evaluated there. The solution to this measurement task will be described below.

In the present application, energy transmission occurs inductively from a primary air coil to the secondary side, i.e. the metal to be heated, which is a metal strip. The temperature of the metal strip must be detected without direct measurement for process and testing reasons.

Depending on the used material, the metal strip has a more or less high positive or negative temperature coefficient, i.e. it therefore consists of materials which conduct current better at lower temperatures than at high temperatures. Its electrical resistance therefore increases with rising temperature. This fact is exploited in order to detect the temperature progression during the welding process. As is shown from the drawing of the principal circuit diagram (FIG. 1), the predominantly inductive load circuit is compensated by a bypass capacitor. In FIG. 1, $C_V$ is a bypass capacitor, $X_1$ is a leakage inductance, $X_2$ is an inductance for magnetization, $X_3$ is a secondary inductance (converted to the primary side) and $R_L$ the temperature-dependent metal resistor, i.e. the strip resistance in the example. These resistors jointly form the load impedance XL applied to a supply, wherein the exciter current and the exciter voltage are applied to said load impedance. The transformer T induces eddy currents.

In the illustrated model, a change in the resistance $\Delta R_L$ of the strip resistance leads to a change in the total resistance $Z_L$ of the entire circuit. Irrespective of other influences such as changes in power, voltage and current, this produces a phase shift in the power supply between the supply voltage $U_V$ and the supply current $I_V$. If the circuit is operated in the range of the resonant frequency, this leads to highly useful results. In particular, $\Delta R_L$ is proportional to $\Delta Z_L$, and $\Delta Z_L$ is equivalent to $\Delta \varphi$, and therefore $\Delta R_L$ is equivalent to $\Delta \varphi$. By measuring the supply voltage $U_V$ and the supply current $I_V$ over time, especially in real time, the phase shift $\Delta \varphi$ in the power supply and subsequently the resistance $R_L$ of the metal can be calculated by means of the mathematical model. As a result, the resistance progression can be logged during the welding process. Due to the PTC thermistor properties of the metal, i.e. the temperature dependence, this resistance progression is proportional to the temperature progression during the welding process.

$$R_L = R_0 * e^{b(T_L - T_0)}$$

In an alternative embodiment, the temperature-dependent metal resistor is an NTC thermistor.

$R_0$ is the nominal resistance at room temperature $T_0$, b is the material constant, and $T_L$ the temperature to be determined, measured and associated with the respectively calculated resistance $R_L$.

Calibration of the circuit can be performed for example in such a way that the input frequency F of the supply voltage is changed by $\Delta F$. This leads to a change in the load impedance $X_L$ on the basis of the model calculation, and subsequently to a defined change $\Delta R_L$ in the strip resistance and a defined measured value $\Delta \varphi$.

A calculated value can be determined by means of the invention which is proportional to the strip heating temperature, and by means of its progression it is possible to positively illustrate the relative change of the temperature value in the welding region. All induction heating methods (e.g. also the pan base material in induction ovens) in which the secondary winding consists of material with a positive temperature coefficient could be calibrated according to this method to a relative temperature change statement and can thus be monitored.

An improved and more precise allocation to a physical measuring quantity (° C., ° K) can be achieved with the circuit described below. FIG. 2 and FIG. 3 schematically show the melting-down behavior of a semi-crystalline polymer (e.g. polyethylene). The enthalpy content H (energy quantity per gram) of the substance increases with rising temperature (T). As a result of their molecular structure, polymers do not have a defined melting point but a melting range which can be assumed as an area beneath the curve of the hatched region.

A reasonably constant temperature rise (FIG. 3) will occur with this material property in the melting-down process for thermoplastic materials with the same power supply, before and after the change in the aggregate state. In the range of crystalline melting (in the case of PE, 142° C.), an increase in the temperature in the welding spot will only occur with constant supply of energy when the material around the heating metal has converted predominantly into the plasticized state. This delay in the temperature increase at this temperature point is shown in FIG. 3.

This fact is used in accordance with the invention in such a way that in operation the resistance of the metal arranged as a PTC thermistor is always calculated and is preferably logged, wherein the resistance upon reaching the melting-down temperature of the bed B remains at least virtually constant until the melting down of the bed B and only rises again after the melting, and that the temperature progression calculated from the resistance progression is adjusted to the melting temperature of the bed material before the temperature progression is stored in a memory M.

The measured data detected with respective software support during each welding process are "attached" to the crystalline melting point temperature after passing said temperature point, thus allowing the temperature progression to be allocated to real measured values. All values before and after can thus be allocated to a precise welding strip temperature which is precise up to a few degrees Celsius and the log files can be provided in form of respective temperature curves when calibration is performed between the temperature progression calculated from the resistance progression and the melting temperature associated with the bed material. For this purpose, the curve of the calculated temperature progression in the calculated melting range is shifted for example by the melting temperature characteristic to the material in the direction of the temperature axis. In one embodiment, the non-magnetic bed is a plastic bed.

The invention further relates to an induction welding device IWD, especially for induction connecting sleeves for the melting connection of weldable thermoplastic bodies with a circuit as described above.

The invention claimed is:

1. An induction welding device comprising:
   a non-magnetic bed,
   a metal embedded in the non-magnetic bed,
   a circuit for inductive heating of the metal and for monitoring a temperature of the metal, the circuit comprising a transformer and the metal,
   wherein the transformer induces eddy currents in the metal as a function of an exciter current and an exciter voltage,
   wherein the transformer and the metal together form a load impedance,
   wherein the load impedance has a resonant frequency,
   wherein the exciter current, the exciter voltage, and a phase shift of the exciter current and the exciter voltage relative to each other are measured and logged when the metal is heated,
   wherein a temperature progression of the metal is calculated from the exciter current, the exciter voltage, and the phase shift, and
   wherein the temperature progression is proportional to the phase shift.

2. The induction welding device according to claim 1, wherein the exciter voltage is applied to the load impedance,
   wherein an exciter frequency of the exciter voltage is changed for calibration such that the phase shift and a load impedance change are produced,
   wherein the metal comprises a PTC thermistor or an NTC thermistor, and
   wherein a change in resistance of the PTC thermistor or the NTC thermistor is calculated from the exciter current, the exciter voltage, and the phase shift using a mathematical model of the load impedance.

3. The induction welding device according to claim 2, wherein the load impedance change is logged.

4. The induction welding device according to claim 1, further comprising a memory,
   wherein the metal comprises a PTC thermistor or an NTC thermistor,
   wherein a resistance of the PTC thermistor or of the NTC thermistor is always calculated during operation,
   wherein the resistance remains constant in a region and subsequently rises,
   wherein the temperature progression is calculated from a progression of the resistance, and wherein the temperature progression is calibrated to a melting temperature inherent to a material of the non-magnetic bed before the temperature progression is stored in the memory.

5. The induction welding device according to claim 1, wherein the non-magnetic bed is a plastic bed.

* * * * *